United States Patent
Kim

(10) Patent No.: US 7,215,608 B2
(45) Date of Patent: May 8, 2007

(54) OPTICAL DISK REPRODUCING APPARATUS FOR COMPENSATING FOR TRACKING ERROR BY USING REAL-TIME REPETITIVE CONTROL AND METHOD OF DRIVING OPTICAL DISK REPRODUCING APPARATUS

(75) Inventor: Jeong-hun Kim, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 534 days.

(21) Appl. No.: 10/863,919

(22) Filed: Jun. 9, 2004

(65) Prior Publication Data

US 2005/0018557 A1 Jan. 27, 2005

(30) Foreign Application Priority Data

Jul. 24, 2003 (KR) .................... 10-2003-0051133

(51) Int. Cl.
*G11B 7/00* (2006.01)
(52) U.S. Cl. .................... 369/44.32; 369/53.14
(58) Field of Classification Search ............. None
See application file for complete search history.

(56) References Cited

U.S. PATENT DOCUMENTS

| 6,137,753 | A | 10/2000 | Grimsley ............. | 369/44.32 |
| 6,714,492 | B2 * | 3/2004 | Kim ................. | 369/44.32 |
| 6,785,205 | B2 * | 8/2004 | Park et al. ........... | 369/44.32 |
| 7,079,461 | B2 * | 7/2006 | Cho et al. ........... | 369/53.14 |

FOREIGN PATENT DOCUMENTS

| KR | 02-76763 | 10/2002 |
| WO | 00/65582 | 11/2000 |

OTHER PUBLICATIONS

Kim, Jeong-hun, et al.; "Adaptive Repetitive Control for an Eccentricity Compensation of Optical Disk Driver," Proceeding of the KIEE Summer Annual Conference 2003, p. 2146-2148.

* cited by examiner

*Primary Examiner*—Paul W. Huber
(74) *Attorney, Agent, or Firm*—Mills & Onello LLP

(57) ABSTRACT

An optical disk reproducing apparatus for compensating for a tracking error by using a real-time repetitive control and a method of driving the optical reproducing apparatus are provided. The optical disk reproducing apparatus repetitively compensates for the tracking error in a real time and with high resolution in accordance with the tracking error frequency by using a sampling frequency obtained by performing frequency multiplication on a disk rotation detection signal, corresponding to one rotation of a disk, without initially compensating the tracking error by using tracking error signals in one or several disk rotations. Accordingly, it is possible to cope with a frequency change of the tracking error due to a rotational frequency difference between inner and outer circumferences in a CLV mode or a rotational frequency change generated when the speed changes in a CAV mode. In addition, it is possible to stably compensate for the tracking error without additionally compensating for a phase or gain.

20 Claims, 6 Drawing Sheets

OPTICAL DISK REPRODUCING APPARATUS FOR COMPENSATING FOR TRACKING ERROR BY USING REAL-TIME REPETITIVE CONTROL AND METHOD OF DRIVING OPTICAL DISK REPRODUCING APPARATUS

This application claims the priority of Korean Patent Application No. 2003-51133, filed on Jul. 24, 2003, in the Korean Intellectual Property Office, the contents of which are incorporated herein in their entirety by reference.

BACKGROUND OF THE INVENTION

1. Field of the Invention

The present invention relates to an optical disk reproducing apparatus, and more particularly, to an optical disk reproducing apparatus able to compensate for tracking error, and a method of compensating for the tracking error.

2. Description of the Related Art

An optical disk reproducing apparatus can be a compact disk (CD) player, a digital video disk (DVD) player, a compact disk rewritable (CD-RW) drive, a CD-ROM drive, or a DVD-ROM drive. In general, in the optical disk reproducing apparatus, a laser beam is irradiated on tracks on the disk, reflected light therefrom is picked up by a pickup unit, and audio or video information contained therein is read from the picked-up reflected light. There are spiral tracks on the disk. The coded audio or video information is recorded as pits formed along the tracks. The coded information is read by the laser, provided to the pickup unit tracing the spiral tracks. If the disk tracks are not completely concentric or if a central shaft of a spindle motor for rotating the disk is shaken, a tracking error, that is, an eccentricity error, occurs. If the tracking error deviates from an error tolerance of the optical disk reproducing apparatus, the laser beam cannot accurately trace the tracks, and it may stray away from the tracks.

FIG. 1 is a block diagram illustrating an example of a conventional optical disk reproducing apparatus. The conventional optical disk reproducing apparatus comprises a spindle motor, which rotates an optical disk, a pickup unit 10, a driver 20, an RF amplifier 30, a first adder 40, a servo 50, a second adder 60, a disk rotation detection unit 70, an eccentricity control unit 80, and an eccentricity compensation unit 90. As shown in FIG. 1, the conventional optical disk reproducing apparatus uses a feedforward compensation method to add a compensation signal measured from the tracking error signal TE to a TRD signal. In another method, the conventional optical disk reproducing apparatus compensates for the tracking error by measuring compensation signals from the tracking error signal TE and the output signal TRD of the servo 50 and adding the compensation signals to the respective signal. In the conventional methods of compensating for the tracking error, the tracking error signal TE or the output signal TRD of the servo 50 is extracted during one or tens of disk rotations, and the extracted signal is stored in a memory. The signal stored in the memory is added as a compensation signal to the tracking error signal TE or the output signal TRD of the servo 50 in accordance with the disk rotational frequency, thereby compensating for the tracking error. In the conventional methods, it is difficult to accurately compensate for the tracking error due to external noise or interference when signal is generated. In addition, since the compensation is carried out only by using the values stored in the memory, it is difficult to suitably compensate for the tracking errors due to other causes. In addition, in some of the conventional methods, a compensation signal measured based on one disk rotation is stored, and the tracking error is compensated by using a fixed sampling frequency. In this case, although the number of values stored as the tracking error compensation signal is constant, the number of samples of the tracking error compensation signal varies-depending on speed of the spindle motor. As a result, it is impossible to suitably compensate for the tracking error due to the speed change in a constant angular velocity (CAV) mode or the rotational frequency difference between the inner and outer circumferences in a constant linear velocity (CLV) mode. One conventional optical disk reproducing apparatus is described in International Patent Application No. PCT/JP2000/02562.

In another method described in a patent to OAK Technology, tracking error is compensated by storing a predetermined servo output at every disk rotation, and adding a tracking error signal stored in a memory to the servo output. In this method, a disk rotation detection signal FG corresponding to one rotation of the disk is generated from the spindle motor and used for a sampling frequency in order to store the tracking error signal. For this reason, even if a rotational frequency difference in a CLV mode or the speed change in a CAV mode occurs, the number of samples is constant, and thus, the position of the tracking error signal over the compensation signal is constant. In addition, when the frequency band of the tracking error signal varies depending on the disk speed, it is very difficult to compensate for the change of the servo gain. Accordingly, it is difficult to compensate for the continuous change of the gain. Therefore, at the time of the change of the gain, an unstable compensation section is generated, and suitable tracking error compensation is impossible in the CLV mode.

For example, FIG. 2 shows error compensation characteristics obtained by using the conventional optical reproducing apparatus. In FIG. 2, the upper and lower waveforms correspond to a tracking error signal TE and a servo output signal TRD, respectively. In FIG. 2, regions (a), (b), and (c) indicate a compensation portion at a 24× speed, a speed changing portion, and a re-compensation portion at a changed 48× speed, respectively. As shown in FIG. 2, in a case where compensation is carried out in a lower speed and then the speed is increased, the frequency of the tracking error signal TE is increased in accordance with the increases in the speed. In turn, the increase in the frequency results in the decrease in the servo gain, so that the tracking error may increase. Therefore, it is necessary to additionally compensate for the gain or phase of the servo in accordance with the speed change. In particular, in the region (b), the increase in the tracking error causes the system to be unstable. In addition, if the spindle motor cannot generate at least 24 pulses for one disk rotation, the resolution deteriorates, so that it may severely affect the tracking error compensation performance.

That is, since the conventional optical reproducing apparatuses store tracking error signals in one or several disk rotations and use the stored tracking error signals as a compensation signal, it is difficult to accurately estimate and compensate for the tracking error. Since the conventional apparatuses use a fixed sampling frequency, it is difficult to cope with the speed change and to perform a suitable compensation. In addition, when the tracking error component is extracted at every edge of the disk rotation detection signal FG, since the resolution is determined depending on the number of the pulses output from the spindle motor, it is difficult to cope with the change of the frequency band of the tracking error signal. In addition, even though the tracking error component is extracted at every edge of the disk rotation detection signal FG, the gain of the servo needs to be newly set in accordance with the change of the tracking error signal frequency.

SUMMARY OF THE INVENTION

The present invention provides an optical disk reproducing apparatus capable of repetitively compensating for a tracking error in real time and with high resolution in accordance with a tracking error frequency by using a sampling frequency obtained by performing frequency multiplication on a disk rotation detection signal, corresponding to one rotation of a disk, without initially compensating for the tracking error by using tracking error signals in one or several disk rotations. Therefore, it is possible to tolerate a frequency change of the tracking error due to a rotational frequency difference between inner and outer circumferences in a CLV mode or a rotational frequency change generated when the speed changes in a CAV mode and it is possible to stably compensate for the tracking error without additionally compensating for phase or gain.

The present invention also provides a method of driving an optical reproducing apparatus capable of repetitively compensating for a tracking error in real time and with high resolution in accordance with a tracking error frequency by using a sampling frequency obtained by performing frequency multiplication on a disk rotation detection signal, corresponding to one rotation of a disk, without initially compensating for the tracking error by using tracking error signals in one or several disk rotations. Therefore, it is possible to tolerate a frequency change of the tracking error due to a rotational frequency difference between inner and outer circumferences in a CLV mode or a rotational frequency change generated when the speed changes in a CAV mode and it is possible to stably compensate for the tracking error without additionally compensating for phase or gain.

According to an aspect of the present invention, there is provided an optical disk reproducing apparatus comprising a pickup unit, a tracking driver, an RF amplifier, a first adder, a tracking servo, a disk rotation detection unit, a frequency multiplier, and an eccentricity compensation unit. The pickup unit reads information coded on an optical disk and outputs an RF signal in response to a tracking driving signal. The tracking driver processes a tracking control signal and outputs the tracking driving signal. The RF amplifier processes the RF signal and outputs a tracking error signal. The first adder adds the input tracking error signal to an eccentricity compensation signal and outputs an added signal. The tracking servo processes an output signal of the first adder and outputs the tracking control signal. The disk rotation detection unit checks the number of pulses which are output from a spindle motor for rotating the optical disk and outputs a disk rotation detection signal. The frequency multiplier performs frequency multiplication on the disk rotation detection signal and outputs a sampling signal. The eccentricity compensation unit outputs the eccentricity compensation signal extracted during a previous disk rotation cycle, in a sampling signal cycle, and extracts another eccentricity compensation signal, which is to be output during the next disk rotation cycle, using the output eccentricity compensation signal and the tracking error signal.

In one embodiment, the eccentricity compensation unit comprises a second adder, a bandpass filter, and a latch and memory unit. The second adder adds the output eccentricity compensation signal to the input tracking error signal and outputs an added signal. The bandpass filter bandpass-filters an output signal of the second adder. The latch and memory unit outputs the eccentricity compensation signal stored during the previous disk rotation cycle in the sampling signal cycle and stores the bandpass-filtered signal as another eccentricity compensation signal, which is to be output during the next disk rotation cycle.

The eccentricity compensation unit may further comprises a first reference value storage unit, which stores a first reference value; and a first switch, which outputs, in response to a logical state of a first switch control signal, one of the first reference value and the tracking error signal output from the RF amplifier as the tracking error signal input to the second adder. The first switch control signal can be a signal the logical state of which changes when a disk defect or a shorter jump than a predetermined limit value occurs.

In one embodiment, the eccentricity compensation unit further comprises a second reference value storage unit, which stores a second reference value; and a second switch, which outputs, in response to a logical state of a second switch control signal, one of the second reference value and the eccentricity compensation signal output from the latch and memory unit as the tracking error signal input to the first adder. The second switch control signal can be a signal the logical state of which changes when a longer jump than a predetermined limit value occurs. The second switch control signal can have the same logical state as the first switch control signal when a longer jump than a predetermined limit value occurs.

In one embodiment, the frequency multiplier comprises a capture counter and a match counter. The capture counter outputs a predetermined system clock cycle number divided by data number to be sampled at every disk rotation as an initial setting value, wherein the predetermined system clock cycle number is calculated at every rising or falling edge of the disk rotation detection signal. The match counter generates a digital pulse as the sampling signal at the number of system clock cycles corresponding to the initial setting value and outputs the digital pulse.

The disk rotation detection signal is a signal indicating one rotation of the optical disk. The disk rotation detection signal is a signal the frequency of which changes depending on a track position on the optical disk in a CLV mode and a speed change of the optical disk-in a CAV mode.

According to another aspect of the present invention, there is provided a method of driving an optical disk reproducing apparatus, the method comprising the steps of: (a) reading information coded on an optical disk and outputting an RF signal, in response to a tracking driving signal; (b) processing a tracking control signal and outputting the tracking driving signal; (c) processing the RF signal and outputting a tracking error signal; (d) adding the input tracking error signal to an eccentricity compensation signal and outputting an added signal; (e) processing an output signal of the first adder and outputting the tracking control signal; (f) checking the number of pulses, which are output from a spindle motor for rotating the optical disk, and outputting a disk rotation detection signal; (g) performing frequency multiplication on the disk rotation detection signal and outputting a sampling signal; and (h) outputting the eccentricity compensation signal extracted during a previous disk rotation cycle in a sampling signal cycle and extracting another eccentricity compensation signal, which is to be output during the next disk rotation cycle, by using the output eccentricity compensation signal and the tracking error signal.

In one embodiment, step (h) comprises the steps of: (h1) adding the output eccentricity compensation signal to the input tracking error signal and outputting an added signal; (h2) bandpass-filtering on an output signal of the second adder; and (h3) outputting the eccentricity compensation signal stored during the previous disk rotation cycle in the sampling signal cycle and storing the bandpass-filtered signal as another eccentricity compensation signal, which is to be output during the next disk rotation cycle.

In one embodiment, step (h) further comprises the steps of: (h4) storing a first reference value; and (h5) in response to a logical state of a first switch control signal, outputting one of the first reference value and the tracking error signal as the tracking error signal.

In one embodiment, the first switch-control signal is a signal the logical state of which changes when a disk defect or a shorter jump than a predetermined limit value occurs.

In one embodiment, step (h) further comprises the steps of: (h6) storing a second reference value; and (h7) in response to a logical state of a second switch control signal, outputting one of the second reference value and the eccentricity compensation signal as the tracking error signal.

In one embodiment, the second switch control signal is a signal the logical of which state changes when a longer jump than a predetermined limit value occurs.

In one embodiment, the second switch control signal is in the same logical state as the first switch control signal when the longer jump occurs.

In one embodiment, step (g) comprises the steps of: (g1) outputting a predetermined system clock cycle number divided by data number to be sampled at every disk rotation as an initial setting value, wherein the predetermined system clock cycle number is calculated at every rising or falling edge of the disk rotation detection signal; and (g2) generating a digital pulse as the sampling signal at the number of system clock cycles corresponding to the initial setting value and outputting the digital pulse.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
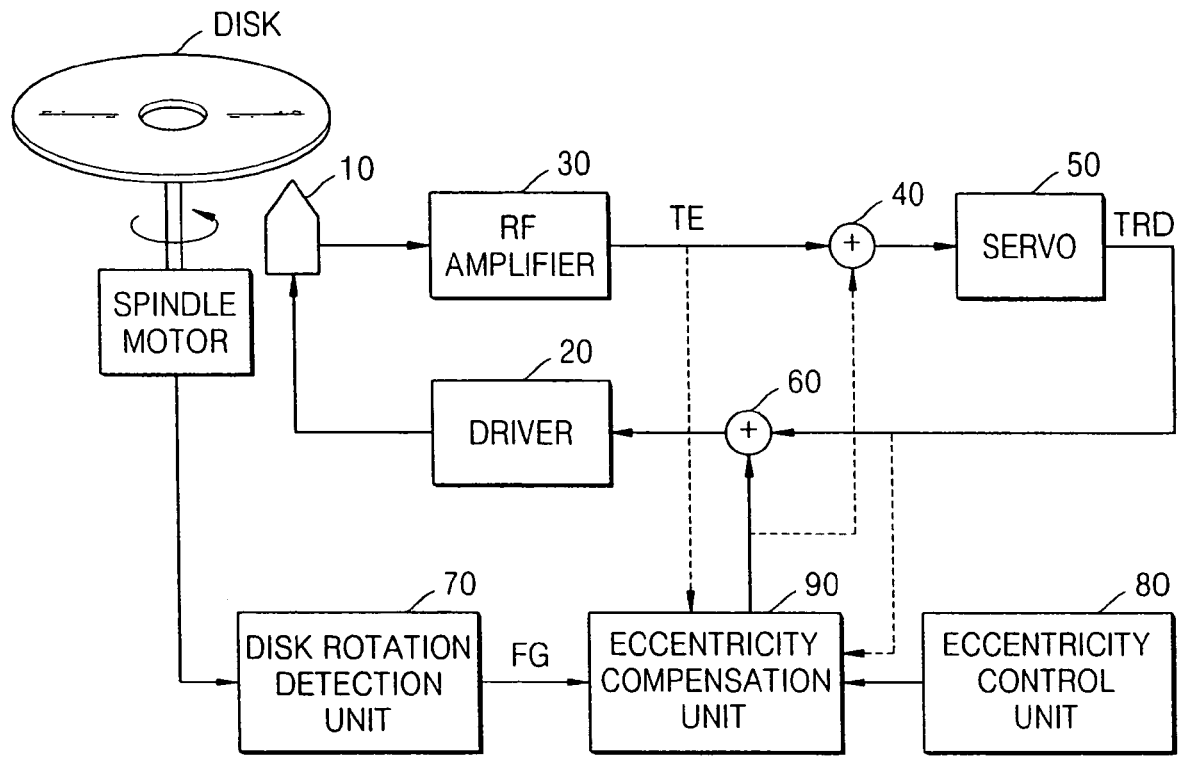
FIG. 1 is a block diagram illustrating an example of a conventional optical disk reproducing apparatus.
Figure 2:
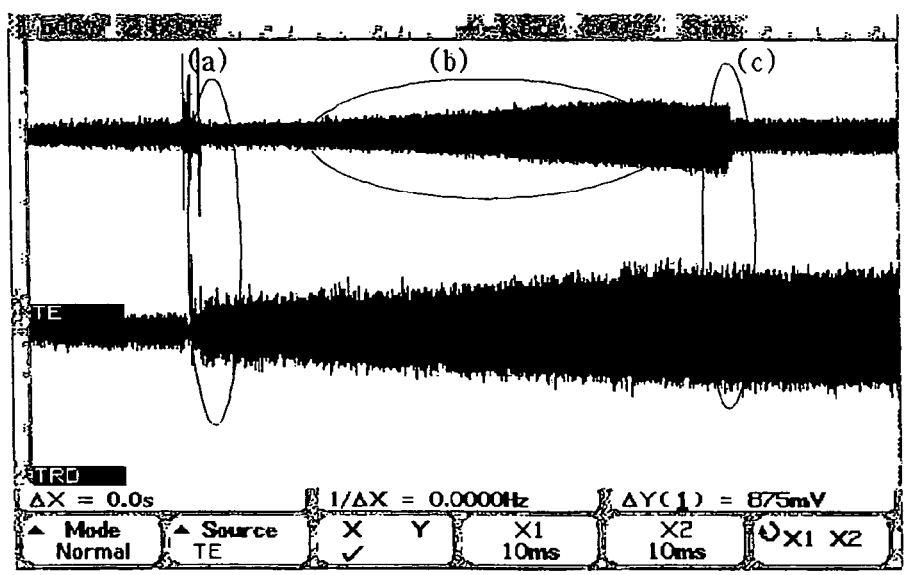
FIG. 2 is a waveform diagram illustrating tracking error compensation performed in the conventional optical disk reproducing apparatus.
Figure 3:
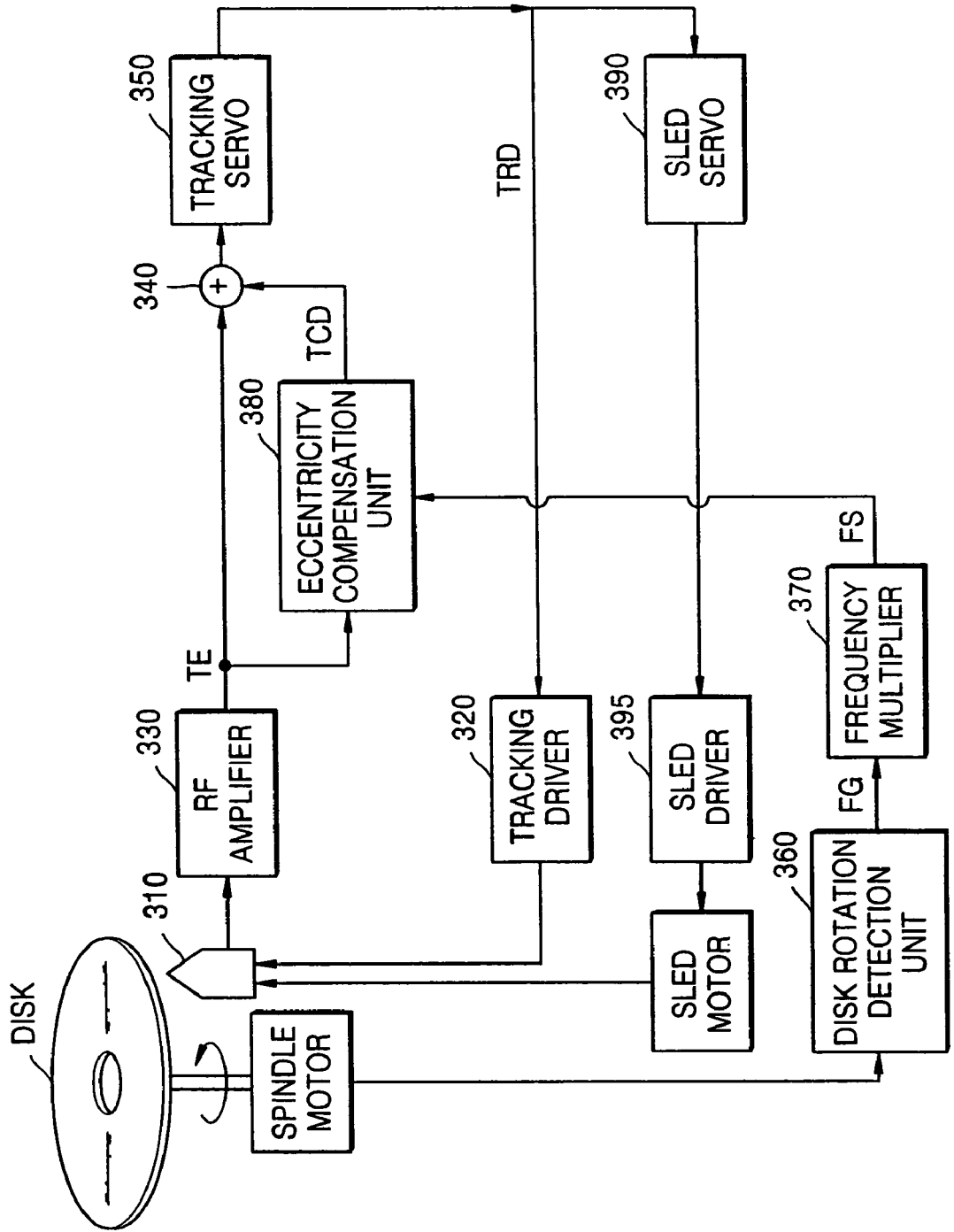
FIG. 3 is a block diagram illustrating an optical disk reproducing apparatus according to the present invention.

FIG. 3 is a block diagram illustrating an optical disk reproducing apparatus according to the present invention. Referring to FIG. 3, the optical disk reproducing apparatus comprises a spindle motor, which rotates an optical disk, a pickup unit 310, a tracking driver 320, an RF amplifier 330, a first adder 340, a tracking servo 350, a disk rotation detection unit 360, a frequency multiplier 370, and an eccentricity compensation unit 380. In addition, the optical disk reproducing apparatus can include a sled motor, a sled servo 390, and a sled driver 395. In addition, the optical disk producing apparatus further comprises constant angular velocity (CAV) and constant linear velocity (CLV) mode control circuits, which control the rotation of the spindle motor, and a focusing servo, which control a focusing actuator for moving up/down the pickup unit 310. In accordance with the invention, the tracking servo 350, which controls the tracking actuator for moving left/right the pickup unit 310, stably performs the eccentricity compensation.

The pickup unit 310 reads information coded on an optical disk and outputs a radio frequency (RF) signal in response to a tracking driving signal. The pickup unit comprises the focusing actuator, which moves upwards and downwards with reference to the data-recorded plane of the optical disk in order to accurately focus a laser beam on the optical disk, and the tracking actuator, which moves to the left or to the right in order to allow the laser beam to accurately trace tracks on the optical disk. The focusing actuator and the tracking actuator are not shown in FIG. 3.

The tracking driver 320 processes a tracking control signal TRD and outputs the tracking driving signal.

The sled servo 390 and the sled diver 395 are used to roughly trace tracks in a case of a long jump of the optical disk. The sled servo 390 performs a low pass filtering on the tracking control signal TRD and outputs a sled control signal. The sled driver 395 processes the sled control signal and outputs a sled driving signal. Accordingly, the sled motor directly moves the pickup unit 310 in the case of the long jump of the optical disk.

The RF amplifier 330 processes the RF signal and outputs a tracking error signal TE. The RF amplifier 330 detects the tracking error signal TE by amplifying the RF signal, which is read from the optical disk by the pickup unit 310. In addition, the RF amplifier 330 detects a focusing error signal (not shown), which is used to control the focusing actuator.

The first adder 340 adds the tracking error signal TE to an eccentricity compensation signal TCD and outputs an added signal. The eccentricity compensation signal TCD is the output signal of the eccentricity compensation unit 380.

Figure 10:
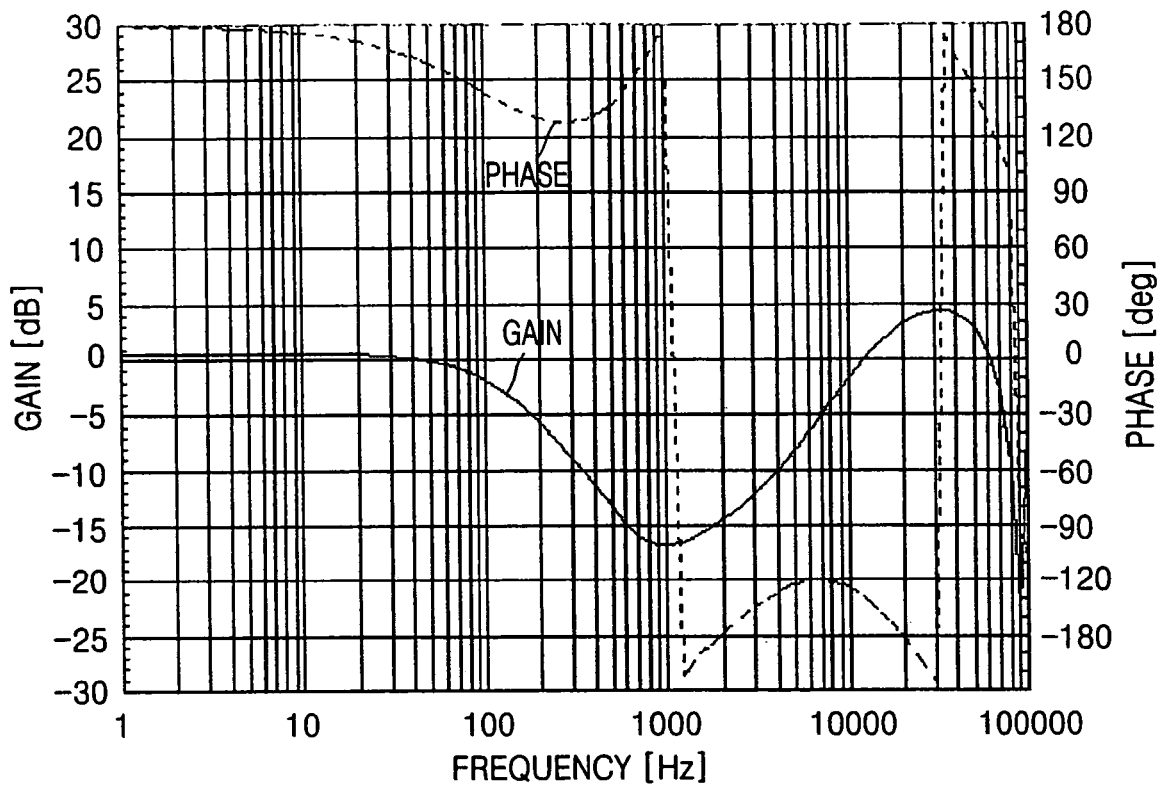
FIG. 10 is a view illustrating frequency characteristics of a tracking servo in FIG. 3.

The tracking servo 350 processes the output signal of the first adder 340 and outputs the tracking control signal TRD. The phase and gain characteristics of the tracking servo 350 are shown in FIG. 10.

The disk rotation detection unit 360 checks the number of pulses, which are output from the spindle motor for rotating the optical disk, and outputs a disk rotation detection signal FG corresponding to one rotation of a disk. The spindle motor outputs 18, 36, or other number of pulses for one rotation depending on the pole numbers of the motor. Accordingly, the disk rotation detection signal FG varies depending on the track point on the optical disk in the CLV mode and the speed change of the optical disk in the CAV mode.

Figure 4:
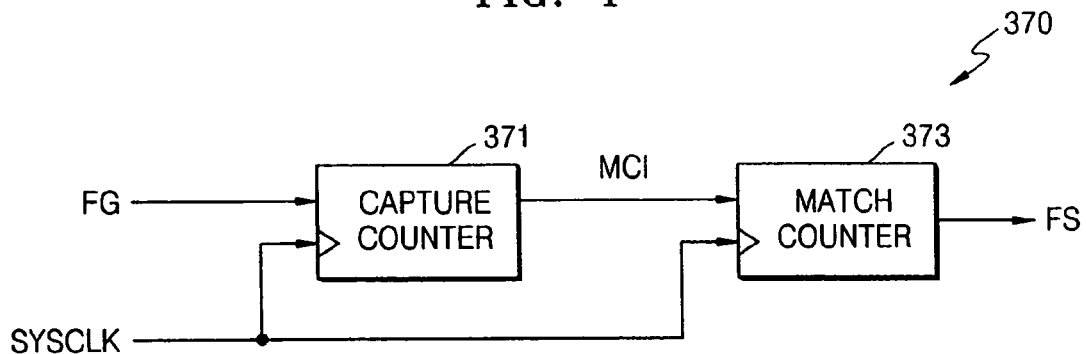
FIG. 4 is a detailed block diagram illustrating a frequency multiplier in FIG. 3.
Figure 6:
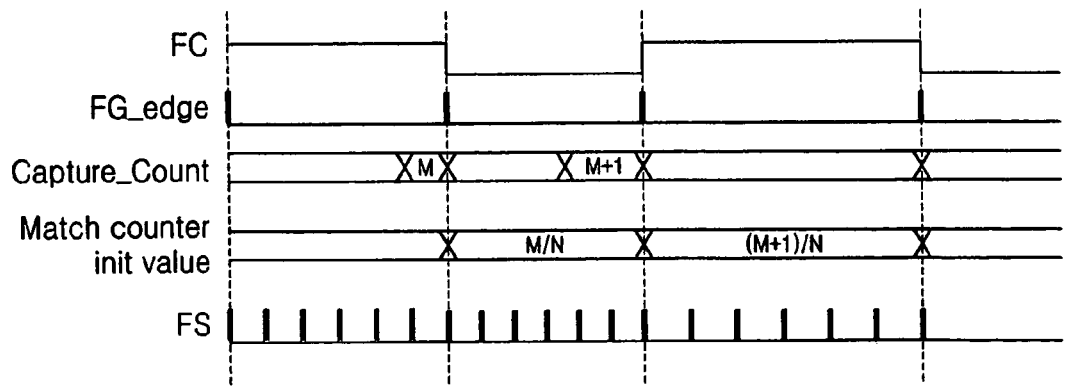
FIG. 6 is a timing diagram illustrating operations of the frequency multiplier in FIG. 3.

The frequency multiplier 370 performs frequency multiplication on the disk rotation detection signal FG and outputs a sampling signal FS. FIG. 4 is a detailed block diagram illustrating one embodiment of the frequency multiplier 370 in FIG. 3. The frequency multiplier 370 comprises a capture counter 371 and a match counter 373. The capture counter 371 outputs a cycle number FG_Count of a predetermined system clock SYSCLK divided by data number to be sampled at every disk rotation, N, as an initial setting value MCI. The predetermined system clock cycle number FG_Count is calculated at every rising or falling edge of the disk rotation detection signal FG. FIG. 6 is a timing diagram illustrating these relations. The predetermined system clock cycle number FG_Count, which is calculated at every rising or falling edge of the disk rotation detection signal FG, varies depending on the speed change of the disk. In FIG. 6, it is assumed that the cycle number FG_Count varies as M or M+1. Accordingly, the initial setting value MCI of the match counter 373 varies as M/N or (M+1)/N. The match counter 373 generates a digital signal as the sampling signal FS every system clock cycle number, for example, M/N, which corresponds to the initial setting value MCI.

Assuming that the frequencies of the tracking error signal TE and the sampling signal FS are $f_{TE}$ and $f_{FS}$, respectively, the relation therebetween is represented by the following equation 1. Equation 1 means that the eccentricity compensation unit 380 samples N tracking error signals TE at every disk rotation by using the sampling signal FS. The data number sampled at every disk rotation, N, is constant. The N tracking error signals sampled during the previous disk rotation are stored in a latch and memory unit 386 (referring to FIG. 5), which stores N data. The stored data are used as the eccentricity compensation signal TCD during the next disk rotation.

$$f_{FS}=f_{TE}\times N \quad \text{[Equation 1]}$$

Figure 5:
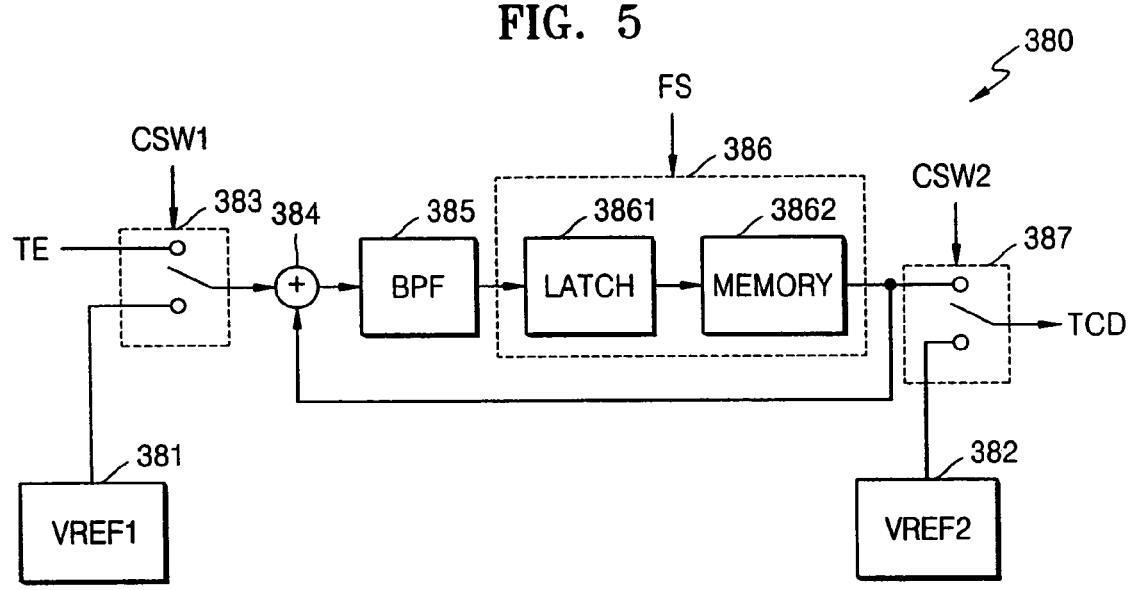
FIG. 5 is a detailed block diagram illustrating an eccentricity compensation unit in FIG. 4.

The eccentricity compensation unit 380, in a cycle of a sampling signal FS, outputs the eccentricity compensation signal TCD extracted during the previous disk rotation cycle and extracts another eccentricity compensation signal TCD, which is to be output during the next disk rotation cycle, by using the output eccentricity compensation signal TCD and the tracking error signal TE. FIG. 5 is a detailed block diagram illustrating one embodiment of the eccentricity compensation unit 380 in FIG. 4. The eccentricity compensation unit 380 comprises a second adder 384, a bandpass filter 385, and the latch and memory unit 386. The eccentricity compensation unit 380 repeats the above operations in a real time for every disk rotation. In FIG. 5, the eccentricity compensation unit 380, in the cycle of the sampling signal FS, outputs the eccentricity compensation signal TCD stored during the previous disk rotation cycle. The output eccentricity compensation signal TCD is added to the input tracking error signal TE. The added signal is filtered by the bandpass filter 385. The filtered signal is stored as another eccentricity compensation signal TCD, which is to be output during the next disk rotation cycle.

Figure 7A:
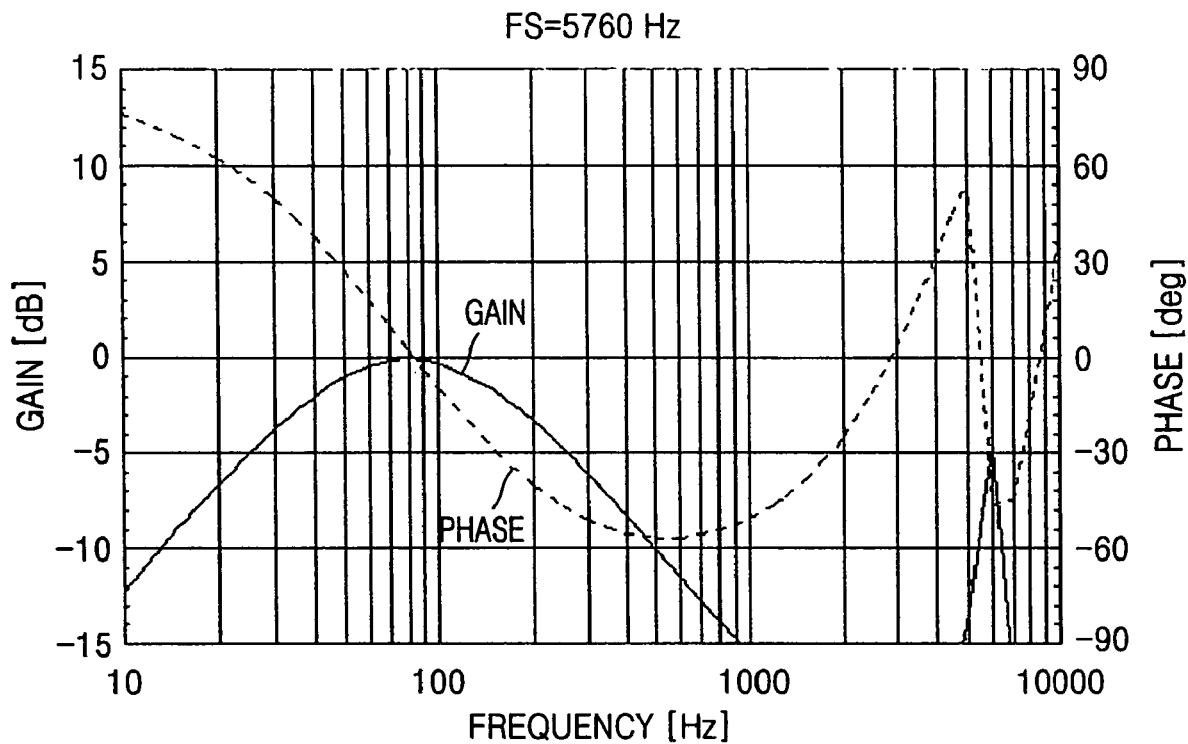
FIGS. 7A and 7B are views illustrating frequency characteristics of a bandpass filter at 24× and 48× speeds, respectively, in accordance with the invention.
Figure 7B:
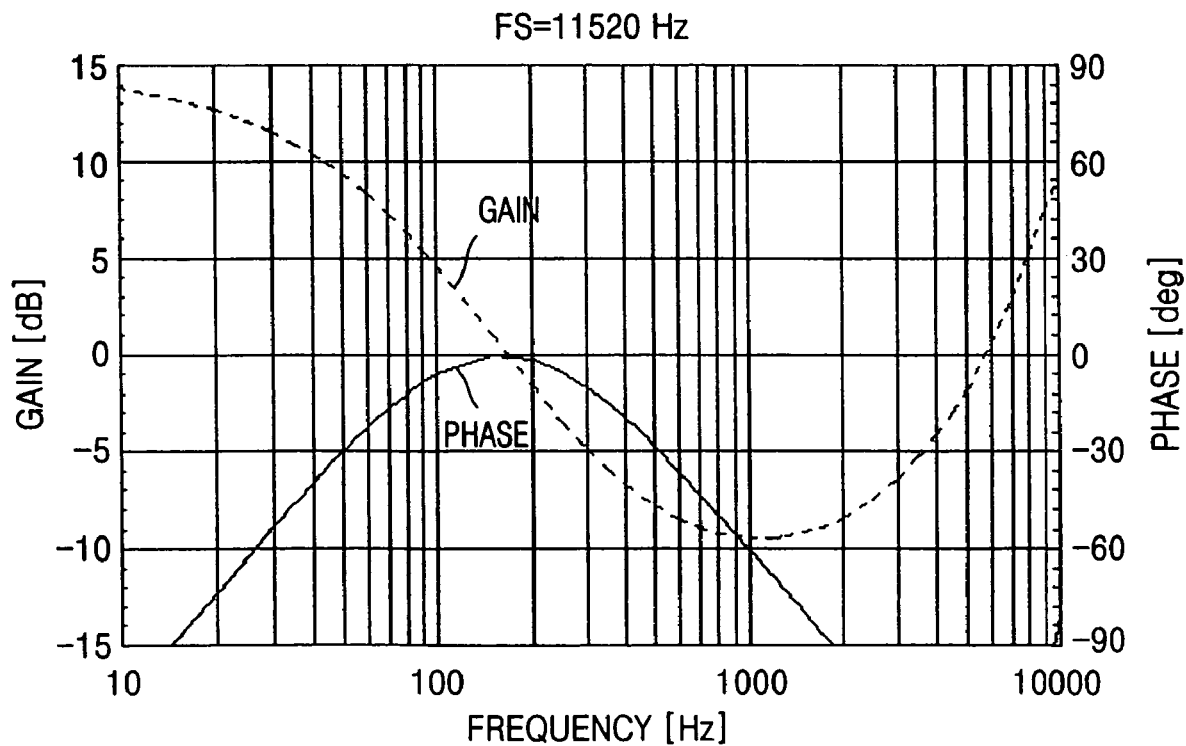

That is, the second adder 384 adds the output eccentricity compensation signal TCD to the tracking error signal TE and outputs an added signal. The bandpass filter 385 filters the output of the second adder 384 and outputs the filtered signal. FIGS. 7A and 7B are views illustrating frequency characteristics of the bandpass filter 385 at 24× and 48× speeds, respectively. The bandpass filter 385 having a gain of 1 is used in order to prevent oscillation. The bandpass filter 385 tracks the frequency of the tracking error signal TE, so that it can filter the frequency band of the output signal of the second adder 384 in accordance with the variable frequency of the sampling signal FS. FIGS. 7A and 7B illustrate two examples in which the spindle motor outputs 18 pulses during one disk rotation, four-times multiplied pulses is used as the sampling signal FS, and the sampling frequencies are 5760 Hz and 11520 Hz, respectively.

The latch and memory unit 386 outputs the eccentricity compensation TCD signal, which is stored during the previous disk rotation, in the sampling signal FS cycle through a memory 3862. The bandpass filtered signal is stored as another eccentricity compensation signal TCD, which is to be output during the next disk rotation cycle, in a latch 3861. The data stored in the latch 3861 is stored in the memory 3862, after the memory 3862 outputs the eccentricity compensation signal TCD stored during the previous disk rotation cycle. The memory 3862 is reset every N pulses of the sampling signal FS and has enough size to store N bandpass-filtered digital signals. At this time, since the disk rotation detection signal FG varies depending on the track point on the optical disk in the CLV mode and the speed change of the optical disk in the CAV mode, the eccentricity compensation signal TCD is also updated in the memory 3862. Therefore, it is unnecessary for a subsequent tracking servo 50 to perform an additional gain adjustment or phase compensation. The eccentricity compensation signal TCD updated in the memory 3862 is represented by the following equation 2. In equation 2, $R^{K+1}$, BPF(z), $R^k$, and $E^k$ denote the eccentricity compensation signal TCD which is to be output during the next disk rotation cycle, the bandpass filtering, the eccentricity compensation signal TCD which is being currently output, and the tracking error signal TE which is input to the second adder 384, respectively.

$$R^{K+1}(z)=BPF(z)\times(R^k(z)+E^k(z)) \quad \text{[Equation 2]}$$

As shown in FIG. 5, the eccentricity compensation unit 380 may further comprise a first reference storage unit 381 and a first switch 383 in order to cope with a disk defect or a short jump. The first reference storage unit 381 stores a first reference value VREF1. In response to the logical states of a first switch control signal CSW1, the first switch 383 outputs one of the tracking error signal TE output from the RF amplifier 330 and the first reference value VREF1, as the tracking error signal TE input to the second adder 384. For example, if the logical state of the first switch control signal CSW1 is low, the first switch 383 outputs the tracking error signal TE output from the RF amplifier 330. If the logical state of the first switch control signal CSW1 is high, the first switch 383 outputs the first reference value VREF1. The first switch control signal CSW1 is a signal the state of which changes from a high state to a low state when a disk defect or a shorter jump than a predetermined limit value occurs.

The disk defect is an external disturbance except for a disk damage such as an eccentricity created on the disk. The short jump means a short track jump. The predetermined limit value is determined by the designer of the optical disk reproducing apparatus.

As shown in FIG. 5, the eccentricity compensation unit 380 may further comprise a second reference storage unit 382 and a second switch 387 in order to cope with a long jump. The second reference storage unit 382 stores a second reference value VREF2. In response to the logical states of a second switch control signal CSW2, the second switch 387 outputs one of the eccentricity compensation signal TCD output from the latch and memory unit 386 and the second reference value VREF2, as the eccentricity compensation signal TCD input to the first adder 380. For example, if the logical state of the second switch control signal CSW2 is low, the second switch 387 outputs the eccentricity compensation signal TCD output from the latch and memory unit 386. If the logical state of the second switch control signal CSW2 is high, the second switch 387 outputs the second reference value VREF2. The first switch control signal CSW2 is a signal the state of which changes from a high state to a low state when a longer jump than a predetermined limit value occurs. The long jump means a long track jump. The predetermined limit value is determined by the designer of the optical disk reproducing apparatus.

Figure 8:
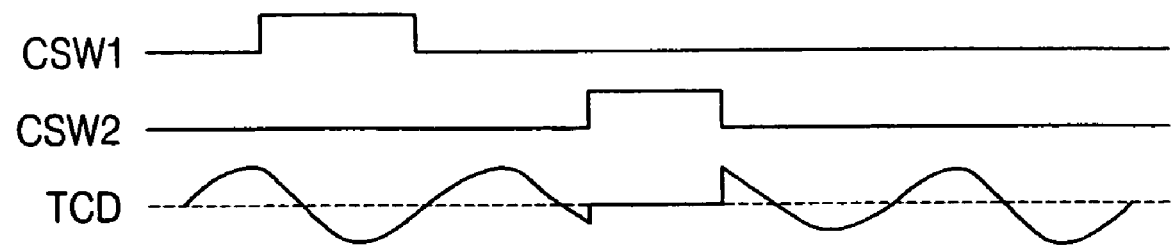
FIG. 8 is a waveform diagram illustrating a relation of first and second control signals and an output signal of the eccentricity compensation unit in accordance with the invention.

FIG. 8 is a waveform diagram illustrating a relation between first and second control signals CSW1 and CSW2 and an output signal of the eccentricity compensation unit 380. If the first switch control signals CSW1 is in a high state, the first switch 382 outputs the first reference value VREF1. This is the case where there is an external disturbance such as a disk defect except for the eccentricity or the short jump. The tracking error signal due to such an external disturbance is not stored in the memory, but the eccentricity component is compensated with the first reference value VREF1. If the second switch control signals CSW2 is in a high state, the second switch 387 outputs the second reference value VREF2. This is the case where there is a large external disturbance such as a long jump. The compensation of the tracking servo 350 has no effect on the sled servo 390 until the jump is finished. This is because the sled servo 390 and the sled driver 395 operate for the long jump. In addition, it is preferable that the first switch control signal CSW1 be in the high state, and thus, the tracking error signal TE not be stored in the memory 3862.

Figure 9:
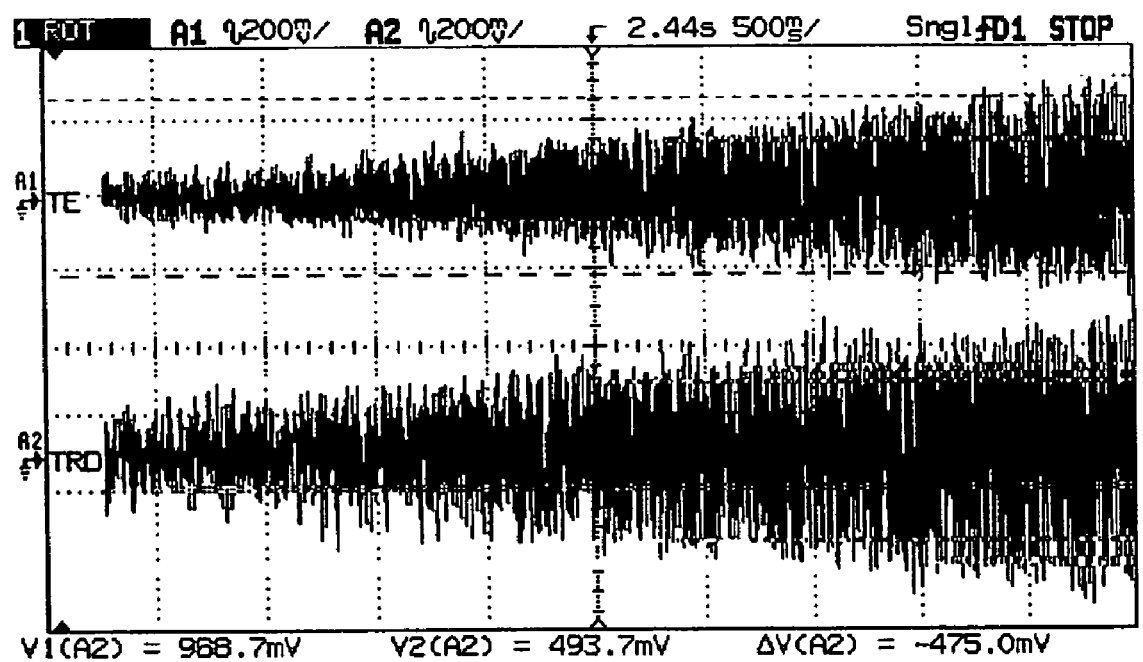
FIG. 9 is a waveform diagram illustrating a relation of a tracking error signal TE and a tracking control signal TRD when the eccentricity compensation unit in FIG. 3 is not employed.

FIG. 9 is a waveform diagram illustrating a relation between a tracking error signal TE and a tracking control signal when the eccentricity compensation unit 380 in FIG. 3 is not employed. The waveform corresponds to a case where a 210 μm eccentric disk is mounted and the speed varies from 24× to 48× in the CAV mode. At a 24× speed, the eccentricity error occurs in the tracking error signal TE. As the speed is increased, the gain of the tracking servo 350 is insufficient, and the eccentricity error component is gradually increased. Since the eccentricity error component is proportional to the rotational frequency, the frequency of the tracking error signal TE is increased as the speed is increased. Referring to FIG. 10, as the speed is increased from 24× to 48× in the CAV mode, the frequency of the tracking error signal TE is increased from 80 Hz to 160 Hz. As a result, the gain of the tracking servo 350 is decreased in the frequency characteristics. In order to converge the eccentricity error to zero, the tracking servo 350 outputs the tracking control signal TRD corresponding to the error value. However, since the gain and phase are not completely controlled, the eccentricity error component is gradually increased.

Figure 11:
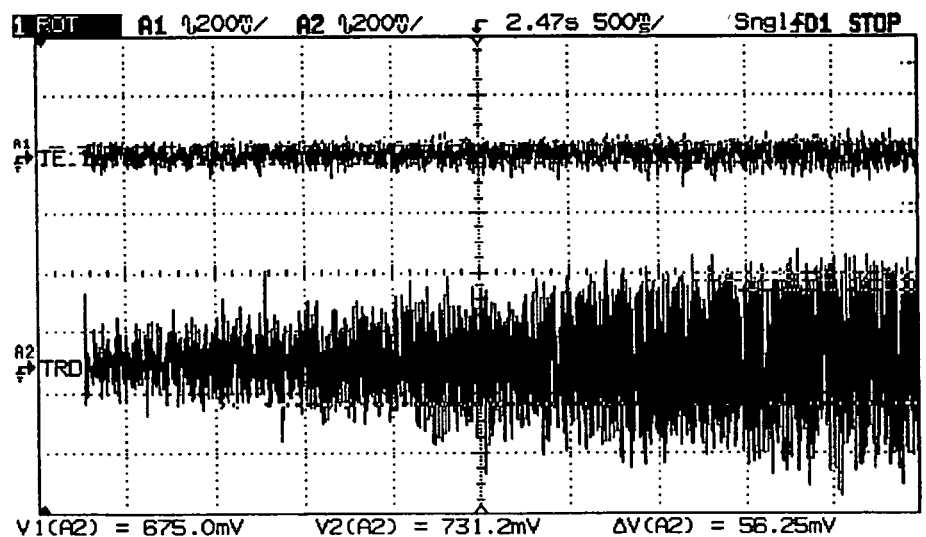
FIG. 11 is a waveform diagram illustrating a relation of a tracking error signal TE and a tracking control signal TRD when the eccentricity compensation unit in FIG. 3 is employed.

FIG. 11 is a timing diagram illustrating a relation between a tracking error signal TE and a tracking control signal when the eccentricity compensation unit 380 in FIG. 3 is employed. The waveform corresponds to a case where the eccentricity compensation unit 380 is employed under the same conditions as those of FIG. 9. Even when the speed is increased, the output of the tracking servo 350 is suitably compensated for by the eccentricity compensation unit 380. Therefore, an eccentricity error component does not occur in the tracking error signal TE, and the tracking servo 350 stably operates. Besides, if the eccentricity compensation unit 380 is employed, the tracking servo 350 can operate while appropriately coping with the disk defect, the short jump, and the long jump. As a result, the tracking error can be stably compensated for without the tracking servo 350 additionally performing the phase or gain compensation.

As described above, the optical disk reproducing apparatus, according to the embodiment of the present invention, comprises the eccentricity compensation unit 380 and it repetitively performs a real time operation of outputting the eccentricity compensation signal TCD stored in the previous disk rotation cycle in the cycle of the sampling signal FS, adding the output eccentricity compensation signal TCD and the input tracking error signal TE, bandpass-filtering the added signal, and storing the eccentricity compensation signal TCD, which is to be output during the next disk rotation cycle, so that the tracking error can be compensated with high resolution in accordance with the tracking error frequency.

As described above, the optical disk reproducing apparatus according to the present invention repetitively compensates for the tracking error in a real time and with high resolution in accordance with a tracking error frequency by using a sampling frequency obtained by performing frequency multiplication on a disk rotation detection signal corresponding to one rotation of a disk without initially compensating for the tracking error by using tracking error signals in one or several disk rotations. Accordingly, it is advantageously possible to cope with a frequency change of the tracking error due to a rotational frequency difference between inner and outer circumferences in a CLV mode or a rotational frequency change generated when the speed changes in a CAV mode. In addition, it is advantageously possible to stably compensate for the tracking error without additionally compensating for the phase or gain.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical disk reproducing apparatus comprising:
   a pickup unit, which reads information coded on an optical disk and outputs an RF signal in response to a tracking driving signal;
   a tracking driver, which processes a tracking control signal and outputs the tracking driving signal;
   an RF amplifier, which processes the RF signal and outputs a tracking error signal;
   a first adder, which adds the input tracking error signal to an eccentricity compensation signal and outputs an added signal;

a tracking servo, which processes an output signal of the first adder and outputs the tracking control signal;

a disk rotation detection unit, which checks the number of pulses output from a spindle motor for rotating the optical disk and outputs a disk rotation detection signal;

a frequency multiplier, which performs frequency multiplication on the disk rotation detection signal and outputs a sampling signal; and an eccentricity compensation unit, which outputs the eccentricity compensation signal extracted during a previous disk rotation cycle in a sampling signal cycle and extracts another eccentricity compensation signal, which is to be output during the next disk rotation cycle, using the output eccentricity compensation signal and the tracking error signal.

2. The optical disk reproducing apparatus according to claim 1, wherein the eccentricity compensation unit comprises:

a second adder, which adds the output eccentricity compensation signal to the input tracking error signal and outputs an added signal;

a bandpass filter, which bandpass-filters an output signal of the second adder; and a latch and memory unit, which outputs the eccentricity compensation signal stored during the previous disk rotation cycle in the sampling signal cycle and stores the bandpass-filtered signal as another eccentricity compensation signal, which is to be output during the next disk rotation cycle.

3. The optical disk reproducing apparatus according to claim 2, wherein the eccentricity compensation unit further comprises:

a first reference value storage unit, which stores a first reference value; and a first switch, which outputs, in response to a logical state of a first switch control signal, one of the first reference value and the tracking error signal output from the RF amplifier as the tracking error signal input to the second adder.

4. The optical disk reproducing apparatus according to claim 3, wherein the first switch control signal is a signal the logical state of which changes when a disk defect occurs or a shorter jump than a predetermined limit value occurs.

5. The optical disk reproducing apparatus according to claim 3, wherein the eccentricity compensation unit further comprises:

a second reference value storage unit, which stores a second reference value; and a second switch, which outputs, in response to a logical state of a second switch control signal, one of the second reference value and the eccentricity compensation signal output from the latch and memory unit as the tracking error signal input to the first adder.

6. The optical disk reproducing apparatus according to claim 5, wherein the second switch control signal is a signal the logical state of which changes when a longer jump than a predetermined limit value occurs.

7. The optical disk reproducing apparatus according to claim 5, wherein the second switch control signal is in the same logical-state as the first switch control signal when the longer jump occurs.

8. The optical disk reproducing apparatus according to claim 1, wherein the frequency multiplier comprises:

a capture counter, which outputs a predetermined system clock cycle number divided by data number to be sampled at every disk rotation as an initial setting value, wherein the predetermined system clock cycle number is calculated at every rising or falling edge of the disk rotation detection signal; and a match counter, which generates a digital pulse as the sampling signal at the number of system clock cycles corresponding to the initial setting value and outputs the digital pulse.

9. The optical disk reproducing apparatus according to claim 1, wherein the disk rotation detection signal is a signal indicating one rotation of the optical disk.

10. The optical disk reproducing apparatus according to claim 9, wherein the disk rotation detection signal is a signal the frequency of which changes depending on a track position on the optical disk in a CLV mode and a speed change of the optical disk in a CAV mode.

11. A method of driving an optical disk reproducing apparatus, the method comprising the steps of:

(a) reading information coded on an optical disk and outputting an RF signal, in response to a tracking driving signal;

(b) processing a tracking control signal and outputting the tracking driving signal;

(c) processing the RF signal and outputting a tracking error signal;

(d) adding the input tracking error signal to an eccentricity compensation signal and outputting an added signal;

(e) processing an output signal of the first adder and outputting the tracking control signal;

(f) checking the number of pulses, which are output from a spindle motor for rotating the optical disk, and outputting a disk rotation detection signal;

(g) performing frequency multiplication on the disk rotation detection signal and outputting a sampling signal; and (h) outputting the eccentricity compensation signal extracted during a previous disk rotation cycle in a sampling signal cycle and extracting another eccentricity compensation signal, which is to be output during the next disk rotation cycle, by using the output eccentricity compensation signal and the tracking error signal.

12. The method according to claim 11, wherein step (h) comprises the steps of:

(h1) adding the output eccentricity compensation signal to the input tracking error signal and outputting an added signal;

(h2) bandpass-filtering on an output signal of the second adder; and (h3) outputting the eccentricity compensation signal stored during the previous disk rotation cycle in the sampling signal cycle and storing the bandpass-filtered signal as another eccentricity compensation signal, which is to be output during the next disk rotation cycle.

13. The method according to claim 12, wherein step (h) further comprises the steps of:

(h4) storing a first reference value; and (h5) in response to a logical state of a first switch control signal, outputting one of the first reference value and the tracking error signal as the tracking error signal.

14. The method according to claim 13, wherein the first switch control signal is a signal of which logical state changes when a disk defect or a shorter jump than a predetermined limit value occurs.

15. The method according to claim 13, wherein step (h) further comprises the steps of:

(h6) storing a second reference value; and (h7) in response to a logical state of a second switch control signal, outputting one of the second reference value and the eccentricity compensation signal as the tracking error signal.

16. The method according to claim 15, wherein the second switch control signal is a signal of which logical state changes when a longer jump than a predetermined limit value occurs.

17. The method according to claim 15, wherein the second switch control signal is in the same logical state as the first switch control signal when the longer jump occurs.

18. The method according to claim 11, wherein the step (g) comprises the steps of:
(g1) outputting a predetermined system clock cycle number divided by data number to be sampled at every disk rotation as an initial setting value, wherein the predetermined system clock cycle number is calculated at every rising or falling edge of the disk rotation detection signal; and
(g2) generating a digital pulse as the sampling signal at the number of system clock cycles corresponding to the initial setting value and outputting the digital pulse.

19. The method according to claim 11, wherein the disk rotation detection signal is a signal indicating one rotation of the optical disk.

20. The method according to claim 19, wherein the disk rotation detection signal is a signal of which frequency changes depending on a track position on the optical disk in a CLV mode and a speed change of the optical disk in a CAV mode.

* * * * *